Oct. 11, 1960   G. W. PAINTER   2,955,795
RESILIENT MOUNTING
Filed Jan. 13, 1958

INVENTOR.
Giles W. Painter
BY
Ralph Hammar
attorney

United States Patent Office 2,955,795
Patented Oct. 11, 1960

2,955,795
RESILIENT MOUNTING

Giles Warren Painter, Erie, Pa., assignor to Lord Manufacturing Company, Erie, Pa., a corporation of Pennsylvania Filed Jan. 13, 1958, Ser. No. 708,522

1 Claim. (Cl. 248—358)

This invention is a resilient mounting in which the rubber element has the dual function of a friction damper and a spring. The structure can be made to have the same cushioning and damping action in all directions.

Figure 1:
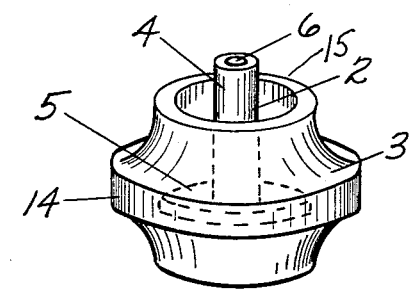
Figure 2:
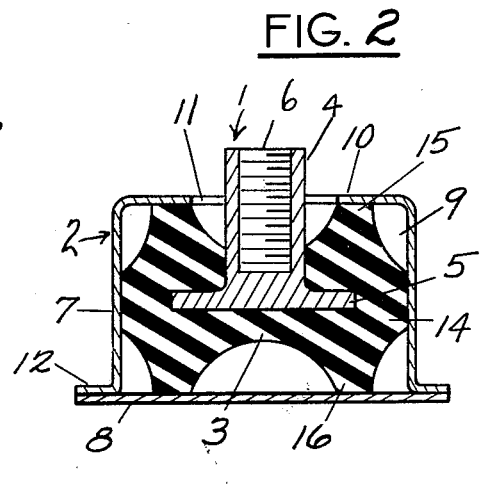
Figure 3:
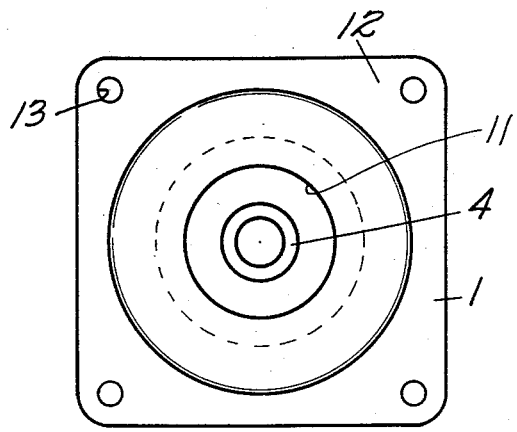

In the drawing, Fig. 1 is a perspective of the resilient element of the mounting; Fig. 2 is a section through the mounting; and Fig. 3 is a top plan view.

In the drawing, the numerals 1 and 2 indicate the supporting and supported members and the numeral 3 indicates the body of rubber or like resilient material interposed between the members. The supported member is shown as a vertical stem 4 having a head 5 at its lower end and being internally threaded at 6 at its upper end for attachment to a device to be supported. The head 5 is embedded in the rubber body 3, preferably by bonding, to transmit load to the body in all directions. The supporting member is shown as a hollow casing made in two pieces, an inverted cup-shaped shell 7, and a bottom plate 8. The shell has axially extending cylindrical side walls 9 coaxial with and spaced around the stem 4. At the top, the shell has a radially extending wall 10 with an opening 11 therein coaxial with the stem and of sufficiently great diameter to prevent metal-to-metal contact with the stem. The bottom plate 8 is secured to a radially projecting flange 12 provided with attachment holes 13 at its corners.

At the center of the body 3 and in a plane common with the head 5 is an annular horizontal rib 14 projecting radially from the body into sliding engagement with the mid-portion of the cylindrical wall 9. In the unstressed condition, the outside diameter of the rib 14 is preferably greater than the inside diameter of the cylindrical walls 9 so that the walls compress the rib radially and establish a friction-gripping force sufficient to hold the rib in position on the wall under the forces encountered during normal vibration. Under conditions of shock or resonance when the forces are substantially greater, the rib 14 slides on the cylindrical wall 9 and introduces a friction damping force limiting the excursion in an axial direction. When the load is in an axial direction, the rib 14 has the friction damping action just described. When the load is in a radial direction, the rib 14 serves as the cushioning element, the load being transmitted radially from the head 5 through the rib 14 to the wall 9. The rib 14 is effective as a cushioning element in all radial directions.

At the top of the body 3 is an upwardly projecting annular rib 15 and at the bottom of the body 3 is a downwardly projecting annular rib 16. The ribs 15 and 16 are of lesser diameter than the inside diameter of the cylindrical wall 9 and are of greater diameter than the stem 4. In the unstressed condition, the axial distance between the ends of the ribs 15 and 16 is greater than the axial distance between the underside of the radial wall 10 and the upper side of the bottom plate 8. Accordingly, when the bottom plate 8 is attached to the flange 12, the radial walls 8 and 10 compress the ribs 15 and 16 axially and provide a friction-gripping force sufficient to hold the ribs in place on the walls 8 and 10 under the forces encountered during normal vibration. Under shock or resonance conditions, when the forces encountered are substantially greater than normal, the ribs 15 and 16 slide on the radial walls 8 and 10 and thereby provide a friction-damping force which tends to limit the amplitude of vibration or movement in a radial direction under these conditions. The ribs 15 and 16 accordingly serve as friction-damping elements for forces in a radial direction. The annular ribs 15 and 16 also serve as cushioning elements in axial directions. When the load is downward, the rib 16 serves as the load-carrying element and when the load is upward the rib 15 serves as the load-carrying element. By varying the section of the ribs 14, 15 and 16, any desired relationship between the cushioning action in radial and axial direction can be obtained. Similarly, by varying the unstressed dimensions of the outer edges of the ribs, the friction-gripping force between those edges and the walls of the supported member can be varied to select the point at which the friction-damping action comes into effect. The ability to do this without making fundamental changes in the design materially extends the usefulness of the mounting, because the mountings are used under a wide variety of conditions and in positions other than the upright position illustrated.

It will be noted that the resilient element of this mounting serves the function of both a mounting and a friction damper. The rib 14, which serves as the load-carrying or cushioning element in the radial direction, serves as the damping element in the axial direction. The ribs 15 and 16, which serve as load-carrying elements when the load is axially up or down, also serve as friction-damping elements when the load is in a radial direction.

What is claimed as new is:

In a resilient mounting, supporting and supported members, one of the members comprising a stem with a head at its lower end and the other of the members comprising a casing having an axially extending cylindrical side wall concentric with the head and parallel to the stem, said casing having end walls at the top and bottom parallel to each other and to the head, the top end wall having an opening therein surrounding and spaced from the stem, a body of resilient material having the head of the stem embedded therein to transmit load to the body in all directions, said body having an annular rib concentric with the head projecting radially from the body around the head in spaced relation to the top and bottom walls and slidably engaging said cylindrical side wall and serving as a load carrying cushioning element in all directions radial to the head, said body further having a pair of annular ribs concentric with the head and respectively projecting axially upward and downward from the body and each in spaced relation to the cylindrical side wall, the upwardly projecting axial rib surrounding and spaced from the stem and slidably engaging the top end wall of the casing and serving as a load carrying cushioning element in the upward direction, the downwardly projecting axial rib slidably engaging the bottom end wall of the casing and serving as a load carrying cushioning element in the downward direction, the unstressed dimensions of said ribs being greater than the space provided within the casing whereby upon assembly the ribs are compressed by the walls toward the center of the body to provide a friction gripping force sufficient to prevent sliding of the ribs on the walls under the forces present during normal amplitudes of vibration, but insufficient to prevent sliding and the resultant friction damping under the forces present during the larger amplitudes encountered during shock and resonance.

References Cited in the file of this patent

UNITED STATES PATENTS

| | | |
|---|---|---|
| 2,115,458 | Geyer | Apr. 26, 1938 |
| 2,215,743 | Saurer | Sept. 24, 1940 |
| 2,256,752 | Saurer | Sept. 23, 1941 |
| 2,308,969 | Reising | Jan. 19, 1943 |
| 2,332,264 | Saurer | Oct. 19, 1943 |